United States Patent
O'Donncha et al.

(10) Patent No.: US 11,802,537 B2
(45) Date of Patent: Oct. 31, 2023

(54) METHODS AND SYSTEMS FOR WAVE ENERGY GENERATION PREDICTION AND OPTIMIZATION

(71) Applicant: INTERNATIONAL BUSINESS MACHINES CORPORATION, Armonk, NY (US)

(72) Inventors: Fearghal O'Donncha, Galway (IE); Bei Chen, Blanchardstown (IE); Sean A. McKenna, Blanchardstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

(21) Appl. No.: 16/102,616

(22) Filed: Aug. 13, 2018

(65) Prior Publication Data

US 2020/0049125 A1 Feb. 13, 2020

(51) Int. Cl.
  *F03B 15/00* (2006.01)
  *G05B 13/02* (2006.01)
  *F03B 13/14* (2006.01)

(52) U.S. Cl.
  CPC .............. *F03B 15/00* (2013.01); *F03B 13/14* (2013.01); *G05B 13/027* (2013.01)

(58) Field of Classification Search
  CPC ......... F03B 15/00; F03B 13/14; G05B 13/027
  See application file for complete search history.

(56) References Cited

U.S. PATENT DOCUMENTS

| | | |
|---|---|---|
| 4,580,400 A | 4/1986 | Watabe et al. |
| 6,100,600 A | 8/2000 | Pflanz |
| 6,857,266 B2 | 2/2005 | Dick |
| 7,322,189 B2 | 1/2008 | Talya et al. |
| 7,989,975 B2 | 8/2011 | Clement et al. |
| 8,587,139 B2 | 11/2013 | Gerber |
| 9,140,231 B1* | 9/2015 | Wilson ............... F03B 13/20 |
| 9,297,351 B2* | 3/2016 | Siegel ............... F03B 13/183 |
| 10,621,019 B1* | 4/2020 | Faulhaber, Jr. ........ G06N 5/04 |
| 10,810,512 B1* | 10/2020 | Wubbels .............. G16H 50/20 |
| 2010/0289267 A1 | 11/2010 | Jang et al. |

(Continued)

FOREIGN PATENT DOCUMENTS

| | | |
|---|---|---|
| CN | 102289571 B | 4/2014 |
| CN | 104050379 A | 9/2014 |

(Continued)

OTHER PUBLICATIONS

Deo et al., "Neural networks for wave forecasting", 2001, pp. 889-898. downloaded from the internet at https://www.sciencedirect.com/science/article/pii/S0029801800000275 (Year: 2001).*

(Continued)

*Primary Examiner* — Christopher E. Everett
*Assistant Examiner* — Olvin Lopez Alvarez
(74) *Attorney, Agent, or Firm* — Griffiths & Seaton PLLC

(57) ABSTRACT

Embodiments for managing a wave energy converter (WEC) device by one or more processors are described. At least one environmental characteristic associated with a WEC device in a body of water is received. A prediction of wave conditions on the body of water is calculated based on the at least one environmental characteristic. A signal representative of the prediction of wave conditions is generated.

6 Claims, 9 Drawing Sheets

(56) References Cited

U.S. PATENT DOCUMENTS

| | | | | |
|---|---|---|---|---|
| 2011/0089689 | A1* | 4/2011 | Gregory | F03B 13/20 |
| | | | | 290/42 |
| 2012/0126667 | A1* | 5/2012 | Schapeler | F03B 13/14 |
| | | | | 310/339 |
| 2017/0161640 | A1* | 6/2017 | Shamir | G06N 20/00 |
| 2017/0214347 | A1* | 7/2017 | Saupe | F03B 15/00 |
| 2017/0298899 | A1* | 10/2017 | Abdelkhalik | F03B 15/00 |
| 2018/0163691 | A1* | 6/2018 | Abdelkhalik | G06F 1/02 |
| 2018/0164754 | A1* | 6/2018 | Wilson | G05B 11/38 |
| 2018/0306164 | A1* | 10/2018 | Lehmann | F03B 13/187 |
| 2018/0310532 | A1* | 11/2018 | Hickson | G06N 3/126 |
| 2018/0313321 | A1* | 11/2018 | Nguyen | F03B 13/08 |
| 2019/0063395 | A1* | 2/2019 | Hagmuller | F03B 17/02 |
| 2019/0120201 | A1* | 4/2019 | Dragic | F03B 13/1885 |
| 2019/0128236 | A1* | 5/2019 | Ringwood | G05B 13/04 |
| 2019/0145373 | A1* | 5/2019 | Lehmann | F03B 13/148 |
| 2019/0156246 | A1* | 5/2019 | Kuo | G06N 5/04 |
| 2019/0331085 | A1* | 10/2019 | Mundon | F03B 15/00 |
| 2021/0097429 | A1* | 4/2021 | Jia | G06N 20/00 |

FOREIGN PATENT DOCUMENTS

| | | | | |
|---|---|---|---|---|
| EP | 3085951 | A1 | 10/2016 | |
| WO | 2005045243 | A1 | 5/2005 | |
| WO | WO2013/030164 | * | 3/2013 | F03B 15/00 |

OTHER PUBLICATIONS

Londhe et al, "One-Day Wave Forecasts Based on Artificial Neural Networks", 2006, pp. 1593-1603, downloaded from the internet https://journals.ametsoc.org/jtech/article/23/11/1593/2692/One-Day-Wave-Forecasts-Based-on-Artificial-Neural (Year: 2006).*

Akesson et al, "A neural network model predictive controller", 2006, pp. 937-946, downloaded from the internet https://www.sciencedirect.com/science/article/pii/S0959152406000618 (Year: 2006).*

Andelrlini et al,"Reactive control of a wave energy converter using artificial neural networks", Aug. 2017, pp. 207-220 downloaded from the internet https://www.sciencedirect.com/science/article/pii/S2214166917300668 (Year: 2017).*

Li et al., "Wave energy converter control by wave prediction and dynamic programming", 2012, pp. 392-403, downloaded from the internet https://www.sciencedirect.com/science/article/pii/S0960148112003163 (Year: 2012).*

James et al, "A machine learning framework to forecast wave conditions", Mar. 18, 2018, pp. 1-10 downloaded from the intrernet https://www.sciencedirect.com/science/article/pii/S0378383917304969 (Year: 2018).*

Peres et al, "Significant wave height record extension byneural networks andr eanalysis wind data", 2015, pp. 128-140 downloaded from the internet https://www.sciencedirect.com/science/article/pii/S1463500315001432 (Year: 2015).*

Mahjoobi et al, "Hindcasting of wave parameters using different soft computing methods", 2008, pp. 28-36, downloaded from the internet Hindcasting of wave parameters using different soft computing methods (Year: 2008).*

Ostrenga, "derive Wind Speed and Direction With MERRA-2 Wind Components", 2019, pp. 3 https://disc.gsfc.nasa.gov/information/data-in-action?title=Derive%20Wind%20Speed%20and%20Direction%20With%20MERRA-2%20Wind%20Components (Year: 2019).*

Zamani et al "Learning from data for wind-wave forecasting", 2008, pp. 953-962, downloaded from the internet, https://www.sciencedirect.com/science/article/pii/S0029801808000632 (Year: 2008).*

Ringwood et al, "Energy-Maximizing Control of Wave-Energy Converters", Oct. 20214, pp. 30-55, downloaded from https://ieeexplore.ieee.org/document/6898109 (Year: 2014).*

Smit, "Deterministic and Stochastic Modelling of Ocean Surface Waves", 2014, pp. 165 downloaded from file:///C:/Users/olopez/Downloads/Smit2014.pdf (Year: 2014).*

Huchet et al, "Nonlinear deterministic sea wave prediction using instantaneous velocity profiles", Jan. 2021, pp. 1-12 dowlaoded from https://www.sciencedirect.com/science/article/pii/S0029801820313998 (Year: 2021).*

Tangd et al, "Learning Stochastic Feedforward Neural Networks", 2013, pp. 1-9 downloaded from https://papers.nips.cc/paper/2013/file/d81f9c1be2e08964bf9f24b15f0e4900-Paper.pdf (Year: 2009).*

Mehta "Deterministic vs Stochastic Machine Learning" discloses the use of deterministic and stochastic method functions in neural networks, 2022, pp. 6 downloaded from https://analyticsindiamag.com/deterministic-vs-stochastic-machine-learning/ (Year: 2022).*

Baheti, ("Activation Functions in Neural Networks [12 Types and USe Cases"), Oct. 2022, pp. 43 downloaded from https://www.v7labs.com/blog/neural-networks-activation-functions (Year: 2022).*

Fraccaro et al ("Sequential Neural Models with Stochastic Layers"), 2016 pp. 1-9, downloaded from https://proceedings.neurips.cc/paper/2016/file/208e43f0e45c4c78cafadb83d2888cb6-Paper.pdf (Year: 2016).*

Ringwood et al., "Control, forecasting and optimisation for wave energy conversion," Proceedings of the 19th World Congress, Aug. 24-29, 2014 (12 pages).

Reikard et al., "Simulating and forecasting ocean wave energy in western Canada," Ocean Engineering 103, 2015 (14 pages).

Li et al., "Model predictive control of a sea wave energy converter: a convex approach," Preprints of the 19th World Congress, Aug. 24-29, 2014 (6 pages).

Sanaz et al., "Wave energy forecasting using artificial neural networks in the Caspian Sea," Maritime Engineering, 2013 (12 pages).

* cited by examiner

500

$$\begin{bmatrix} H_s^{(1)} & T_p^{(1)} & D^{(1)} & u_{wind}^{(1)} & v_{wind}^{(1)} & u_{current}^{(1)} & v_{current}^{(1)} \\ \vdots & \vdots & \vdots & \vdots & \vdots & \vdots & \vdots \\ H_s^{(m)} & T_p^{(m)} & D^{(m)} & u_{wind}^{(m)} & v_{wind}^{(m)} & u_{current}^{(m)} & v_{current}^{(m)} \end{bmatrix}$$

FIG. 5

$$700 \diagdown \begin{bmatrix} (H_s^{(1)})_1 & \cdots & (H_s^{(1)})_n & T_p^{(1)} \\ \vdots & \ddots & \vdots & \vdots \\ (H_s^{(m)})_1 & \cdots & (H_s^{(m)})_n & T_p^{(m)} \end{bmatrix}$$

FIG. 7

METHODS AND SYSTEMS FOR WAVE ENERGY GENERATION PREDICTION AND OPTIMIZATION

BACKGROUND OF THE INVENTION

Field of the Invention

The present invention relates in general to computing systems, and more particularly, to various embodiments for predicting and optimizing wave energy generation.

Description of the Related Art

"Wave power" or "wave energy" refers to the capture or conversion of the energy of wind (or surface) waves on bodies of water (e.g., oceans) to perform useful work, such as electricity generation. By some estimates, the amount of worldwide recoverable coastal wave energy exceeds 2 terawatts (TW). One of the requirements for the successful and efficient commercialization of wave energy generation is the accurate prediction of future waves and/or the energy generation therefrom.

Current wave energy converter (WEC) devices are typically controlled in a "reactive" manner. For example, the resistance presented to the wave motion may be altered or tuned based on the current, detected waves in order to maximize performance/energy production, provide consistent energy generation, and ensuring the survivability of the device. However, in some instances, the devices are not able to react to changing conditions in an ideal manner. For example, the WEC device may not be tuned to generate as much energy as possible given the current wave conditions or may be tuned such that the device experiences unnecessary "wear."

SUMMARY OF THE INVENTION

Various embodiments for managing a wave energy converter (WEC) device by one or more processors are described. In one embodiment, by way of example only, a method for managing a WEC device, again by one or more processors, is provided. At least one environmental characteristic associated with a WEC device in a body of water is received. A prediction of wave conditions on the body of water is calculated based on the at least one environmental characteristic. A signal representative of the prediction of wave conditions is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a matrix of inputs for a wave model according to an embodiment of the present invention;

FIG. 7 is a matrix of outputs for the wave model of FIG. 6 according to an embodiment of the present invention.

DETAILED DESCRIPTION OF THE DRAWINGS

Figure 1:
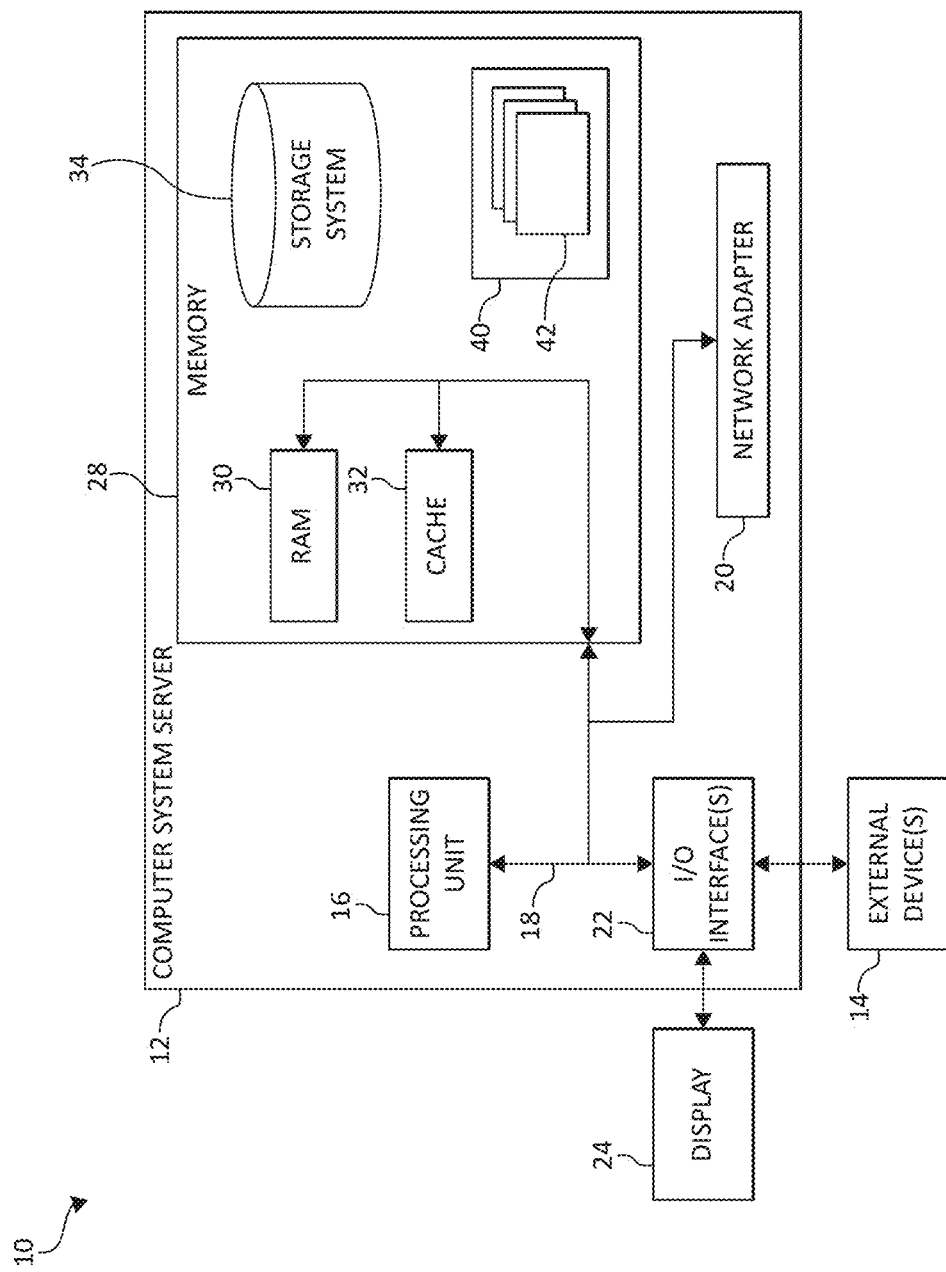
FIG. 1 is a block diagram depicting an exemplary computing node according to an embodiment of the present invention.

As discussed above, "wave power" or "wave energy" refers to the capture or conversion of the energy of wind (or surface) waves on bodies of water (e.g., oceans) to perform useful work, such as electricity generation. By some estimates, the amount of worldwide recoverable coastal wave energy exceeds 2 terawatts (TW). One of the requirements for the successful and efficient commercialization of wave energy generation is the accurate prediction of future waves and/or the energy generation therefrom.

Currently, the control of wave energy converter (WEC) devices usually involves the altering of the resistance presented to the wave motion by the generator in "real-time" such that, ideally, the motion of the device is in resonance with the wave force. For example, the devices may be tuned based on the current wave conditions to widen the operational envelope of the device and improve power capture. As such, WEC devices are typically controlled in a "reactive" manner. That is, the resistance presented to the wave motion is altered or tuned to, for example, maximize performance/energy production and provide consistent energy generation, while still ensuring the survivability of the device. The methods typically used include stochastic time series solutions based on historical data and deterministic forecasting based on distant measurements. These solutions only provide short-term forecasts (e.g., up to 60 seconds) and depend on complex algorithms.

In some instances, the devices are not able to react to changing conditions in an ideal manner. For example, because of quickly changing conditions (e.g., the varying sizes of the waves), the devices may not be able to maximize energy creation as well as possible given the wave size and/or may experience more "wear" than is necessary (e.g., due to excessive movement of the hydraulic system or excessive adjustments made).

To address these needs, some embodiments described herein provide methods and systems for managing and/or controlling WEC devices that are "proactive," as opposed to reactive. In some embodiments, forecast data is utilized to improve the "tuning" of WEC devices to wave conditions, thereby optimizing performance and survivability. Such may be performed utilizing a wave forecasting system that may be deployed directly on the device(s), providing each with distributed prediction of wave forecasts at its respective location.

In some embodiments, the methods and systems described herein provide a computationally "lightweight"

wave forecasting model that results in accurate forecasts (e.g., related to wave height) up to, for example, several days (e.g., 48 hours) in advance. Also provided is the ability to use the forecasts of wave heights to optimize WEC device control systems to maximize device performance and energy generation, as well as prolong the service life of the device. In some embodiments, the methods and system described herein may be contained within (e.g., "onboard") the WEC device(s).

In some embodiments, the methods and systems described herein utilize "machine learning" models trained with historical data and information related to local wave heights, wind speeds, currents, etc. (e.g., determined using a local sensor). The model may be used to create control strategies for WEC devices to optimize performance and/or the service life of the device.

The forecasts of wave heights may enable more effective control of the WEC devices. WEC devices utilizing the methods and systems described herein may be able to predict their own energy production and thus integrated with smart grid networks based on, for example, the supply/demand of the grid. Also, because the mechanical wear/damage to the WEC devices may be reduced due to a reduction in the number of device adjustments, the overall service life of the devices may be increased.

As such, in some embodiments, the methods and/or systems described herein may utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the creation and/or use of a wave forecasting model and/or the controlling of a WEC device using a prediction of wave conditions, as described herein. Utilizing the models, the performance (or operation) of the system (e.g., utilizing/based on new inputs) may be predicted and/or the performance of the system may be optimized by investigating how changes in the input(s) affect the output(s). Additionally, the methods and/or systems may be able to monitor their own performance and make adjustments for future processes/use (e.g., to optimize performance).

In particular, in some embodiments, a method, by one or more processors, for managing a WEC device is provided. At least one environmental characteristic associated with a WEC device in a body of water is received. A prediction of wave conditions on the body of water is calculated based on the at least one environmental characteristic. A signal representative of the prediction of wave conditions is generated.

The calculating of the prediction of wave conditions may be performed with a computing system onboard the WEC device. The computing system may include a machine learning module. The machine learning module may utilizes a multi-layer perceptron.

The WEC device may be controlled based on the prediction of wave conditions. The WEC device may include a power take-off (PTO), and the controlling of the WEC device may include adjusting a resistance exhibited by the PTO. The at least one environmental characteristic may be associated with at least one of winds and water currents.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, WEC devices (and/or the control systems thereof), personal computer systems, server computer systems, thin clients, thick clients, handheld or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
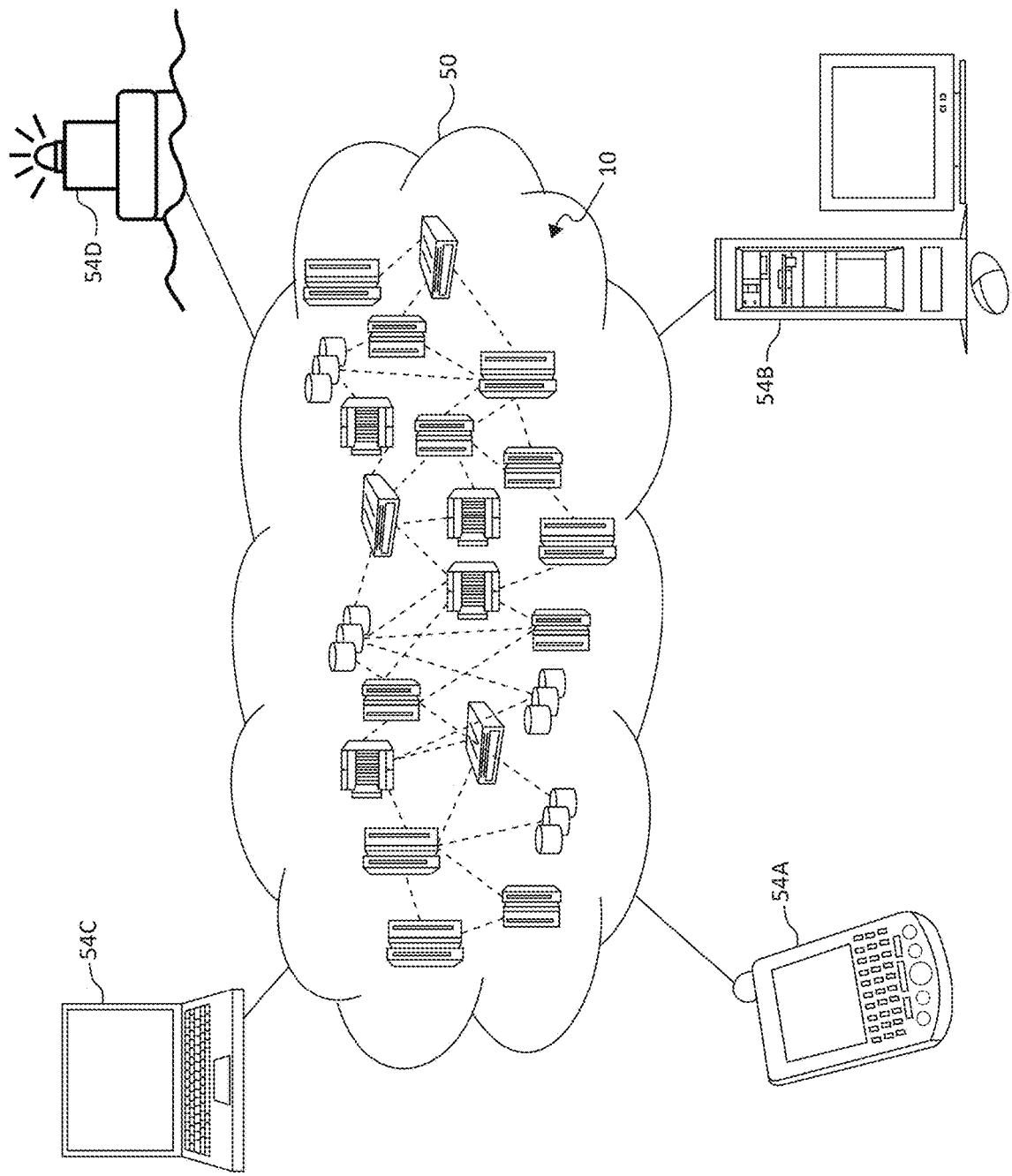
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and WEC devices 54D may communicate. However, it should be noted that in some embodiments, the WEC devices 54D are not in communication with any other computing nodes (e.g., the WEC devices may be "edge" or "fog" computing devices).

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
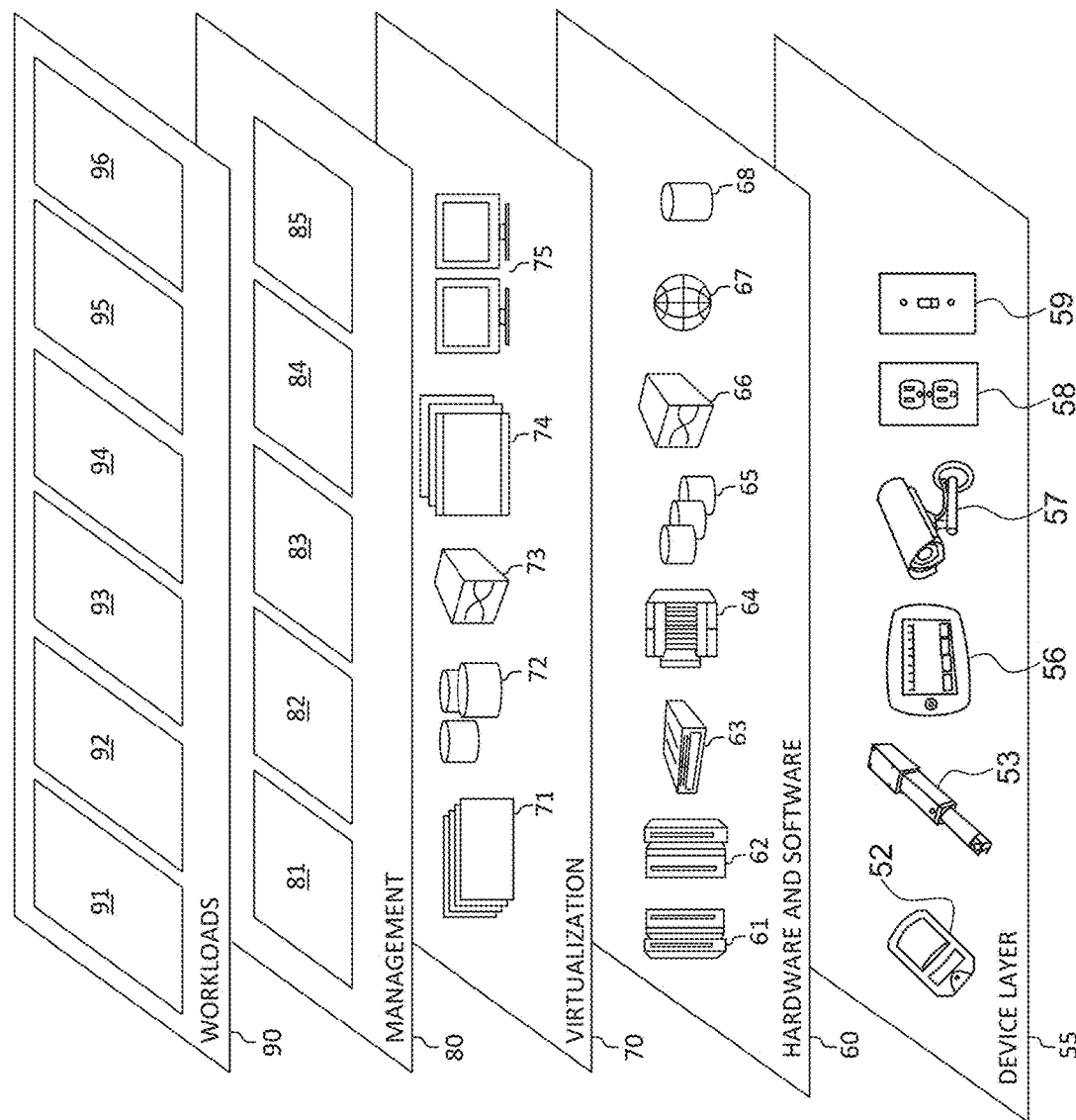
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, WEC devices, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing WEC devices as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described above, some embodiments described herein provide methods and systems for managing WEC devices. In some embodiments described herein, the WEC devices are controlled in a "proactive," as opposed to reactive, manner. For example, forecast data may be utilized to improve the "tuning" of WEC devices to wave conditions, thereby optimizing performance and survivability. Such may be performed utilizing a wave forecasting system that may be deployed directly on the device(s), providing each with distributed prediction of wave forecasts at its respective location. A computationally "lightweight" wave forecasting model may be utilized, which results in accurate forecasts (e.g., related to wave height) up to, for example, several days (e.g., 48 hours) in advance. The forecasts may be used to optimize WEC device control systems to maximize device performance and energy generation, as well as prolong the service life of the device (e.g., by reducing the number of adjustments made and/or optimizing oscillations). In some embodiments, the methods and systems described herein may be contained within (e.g., "onboard") the WEC device(s), such as in an edge computing type implementation.

In some embodiments, the methods and systems described herein utilize "machine learning" models trained with historical data and information related to local wave heights, wind speeds, currents, etc. (e.g., determined using a local sensor). The model forecasts of wave conditions may be used to create control strategies for WEC devices to optimize performance and/or the service life of the device. The forecasts of wave heights may enable more effective control of the WEC devices. WEC devices utilizing the methods and systems described herein may be able to predict their own energy production and thus integrated with smart-grid networks based on, for example, the supply/demand of the grid. Also, because the mechanical wear/damage to the WEC devices may be reduced due to a reduction in the number of device adjustments, the overall service life of the devices may be increased.

Figure 4:
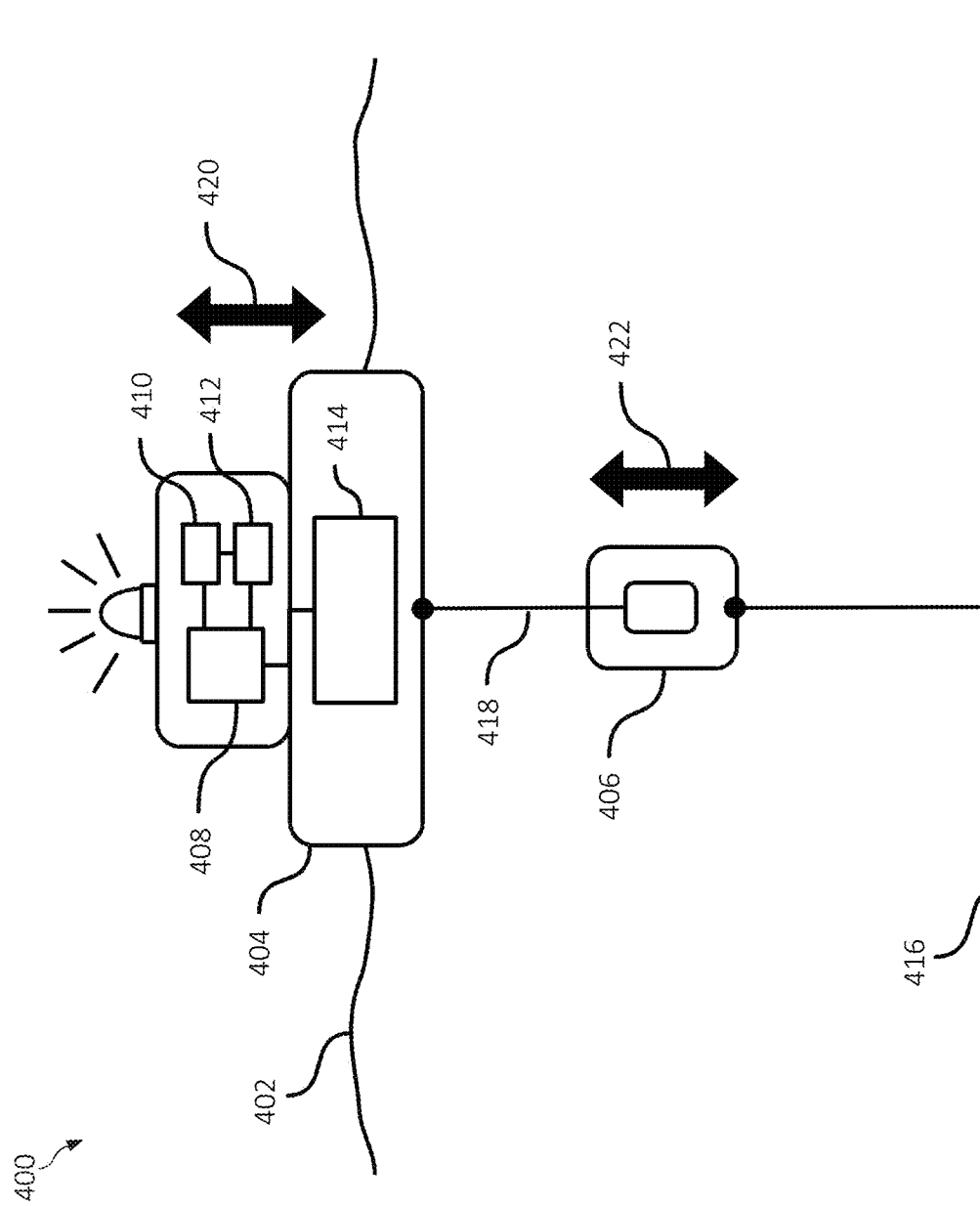
FIG. 4 is a simplified side view of a wave energy converter (WEC) device according to an embodiment of the present invention.

FIG. 4 is a simplified illustration of a WEC device 400 deployed in a body of water 402, according to some embodiments of the present invention. In the example shown, the WEC device 400 is a point absorber (or point absorber buoy), as is commonly understood. However, it should be understood that the methods and systems described herein may be utilized with other types of WEC devices, such as surface attenuators, oscillating wave surge converters, oscillating water column devices, overtopping devices, and submerged pressure differential-based converters.

Still referring to FIG. 4, the WEC device 400 includes a main body (or buoy) 404 and a power take-off (PTO) (or PTO mechanism) 406. The main body 404 of the WEC device 400 generally floats on or near the surface of the body of water 402 and includes (or houses or has coupled/connected thereto) a control system 408, a sensor array 410, a power supply 412, and a generator 414. The control system 408 may include any computing device suitable to control the operation of the WEC device 400 as described herein, and may be in operable communication with the sensor array 410, the battery 412, the generator 414, as well as the PTO 406. In some embodiments, the control system 408 includes an edge computing device, as is commonly understood. In some embodiments, the control system 408 includes and/or utilizes a machine learning module incorporating the wave condition forecasting model(s) and/or an optimization module to optimize energy production based on the forecasted wave conditions and/or a hydraulic control system to control the generator 414 and/or the PTO 406.

Although not shown in detail, the sensor array 410 may include any sensors utilized for detecting environmental characteristics or conditions (e.g., wind speeds and/or directions, current speeds and/or directions, water temperature, air temperature, barometric pressure, etc.) that are used to predict wave conditions, as described in greater detail below. The power supply 412 may be any source of electrical power suitable for powering the WEC device 400 (e.g., the control system 408, the operation/adjusting of the PTO 406, etc.), such as a battery. The generator 414 may include any suitable actuator that is configured to convert motive power (or mechanical energy) into electrical power. The generator 414 may be electrically and/or mechanically coupled to the PTO 406, or alternatively, may be included within (e.g., part of) the PTO 406.

Generally, the PTO 406 is connected to the main body 404 of the WEC device 400 and a floor 416 of the body of water 402 through a cable (or column or member) 418. Although not shown in detail, the PTO 406 may be configured to offer or exhibit resistance to the motion of the main body 404. That is, as the main body 404 moves (e.g., up and down, as shown by arrow 420) due to surface (or wind) waves on the body of water 402, at least a portion of the PTO may similarly move (e.g., up and down, as shown by arrow 422) relative to the main body 404. For example, in some embodiments, the PTO 406 has two portions or components (e.g., a hydraulic system) that move relative to each other when the main body 404 moves up and/down because of surface waves.

This motion may be used (e.g., by the control system 408 and/or the generator 414) to generate electrical power, as is commonly understood. In at least some embodiments, the amount of resistance offered by the PTO 406 (and/or the resistive force created by the PTO 406) is adjustable, as is commonly understood. The electrical power may be used to power the WEC device 400 (e.g., operate the control system 408 and/or charge the power supply 412) and/or may be sent elsewhere (e.g., to the "grid") to be utilized for other purposes through any suitable means (e.g., conductive wire(s) within the cable 418).

In some embodiments, the WEC device 400, or more particularly, the PTO 406, is controlled based on a prediction (or forecast) of wave conditions on the body of water 402 that is generated by, for example, the control system 408. In some embodiments, the control system 408 includes a machine learning module to forecast wave conditions, which may be "trained" before being deployed on the WEC device 400.

FIG. 5 illustrates an exemplary set of inputs 500 for a wave model, according to some embodiments described herein. In the example shown, $H_s$ may refer to global wave height and/or ocean swell conditions (e.g., caused by currents, winds, etc.), as is commonly understood, as the particular point or location associated with that set of data. $T_p$ may refer to the period of detected waves. D may refer to the direction of detected waves. $u_{wind}$ may refer speed (or magnitude) of the east/west component of winds, and $v_{wind}$ may refer to the speed of the north/south component of winds. $u_{current}$ may refer speed (or magnitude) of the east/west component of currents (i.e., within the respective body of water), and $u_{current}$ may refer to the speed of the north/south component of currents.

Figure 6:
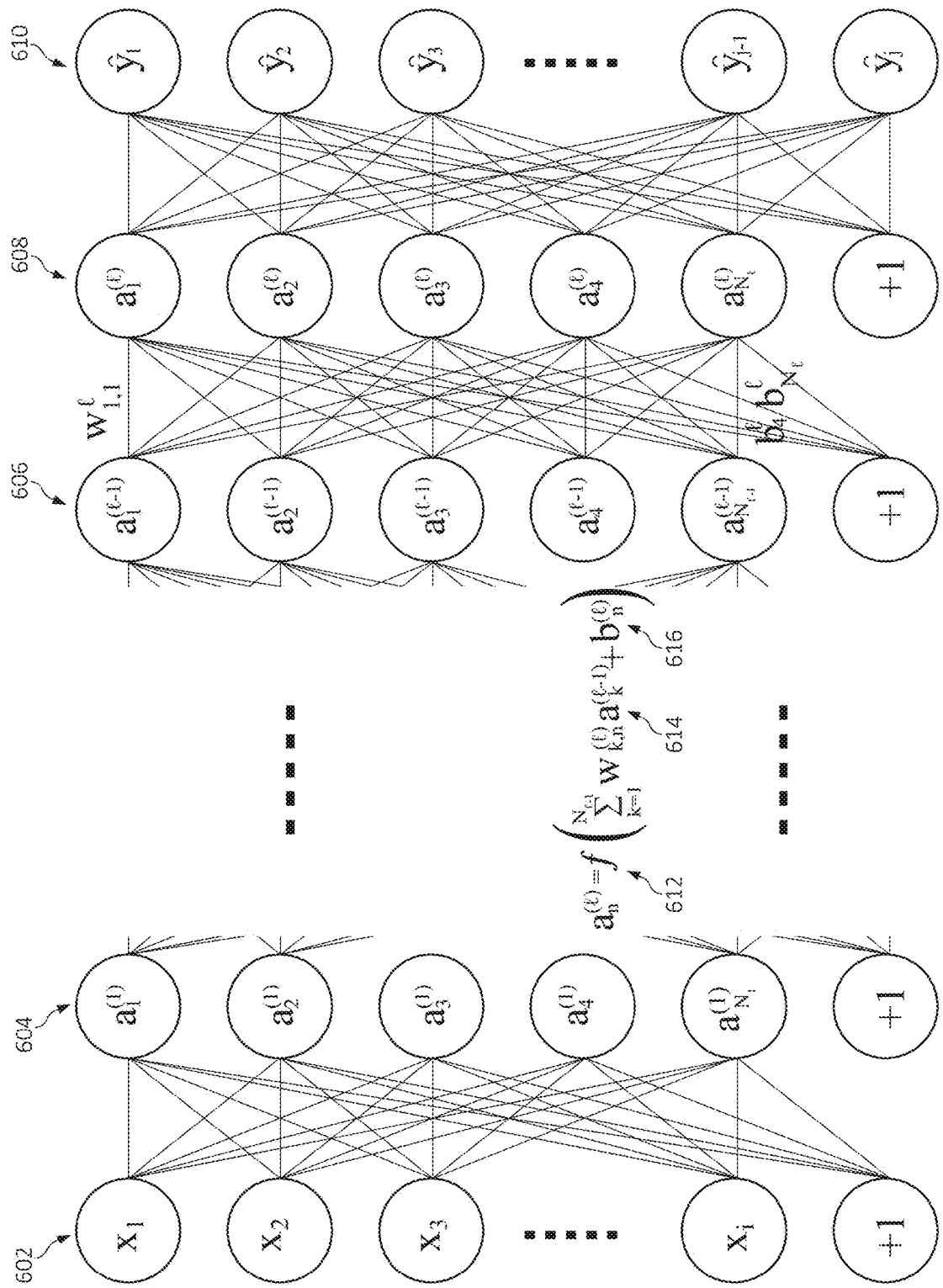
FIG. 6 is diagram of a wave model according to an embodiment of the present invention.

FIG. 6 illustrates a wave model 600, according to some embodiments described herein. In some embodiments, the wave model 600 is an artificial neural network (ANN) utilizing a multi-layer perceptron, as is commonly understood. Shown in FIG. 6 are an input layer 602, a first hidden layer (or hidden layer 1) 604, hidden layer l-1 606, a hidden layer 1 608, and an output layer 610, as well as activation function 612, weights 614, and bias 616. In some embodiments, the wave model takes inputs shown in FIG. 5 to generate a model that may be used to predict wave conditions at a given point, taking, for example, local wind and current conditions as input. FIG. 7 illustrates an exemplary set of outputs 700 for the wave model 600, with $(H_s)_x$ and $T_p$ being the predicted wave heights and periods, respectively, at the given points/locations.

In some embodiments, the outputs 700 are used to predict wave conditions, given, for example, detected local winds and currents at a particular location (e.g., the location of the WEC device being controlled). The predicted wave conditions are in turn used to control the WEC device, such as by setting or tuning the resistance offered by the PTO to optimize performance of the WEC device (e.g., maximize power generation, minimize wear/damage to the device, etc.), as described in greater detail below.

In some embodiments, the control problem definition involves the maximization or the minimization of a prescribed performance objective (e.g., maximize power generation, minimize damaging forces on the PTO mechanism, etc.) subject to proper system constraints (e.g. amplitudes, rates, forces, etc.) That is, the control problem may be considered to be a constrained optimization problem. Energy conversion may be maximized if device velocity is in phase with the excitation force and the device velocity amplitude, |u|, is related to the excitation force ($F_e$) and device resistance ($R_i$) as $$(u) = \frac{F_e}{2R_i} \quad (1)$$

As the buoyancy (e.g., of the main body 404) causes the WEC device to move upwards, motion is resisted by the PTO. Work is performed on (and/or by) the PTO at the rate $$P(t) = F_{PTO}(t)u(t) \quad (2)$$

The fundamental optimization objective of the control of the WEC device (i.e., to adjust resistance of the device ($R_i$) to maximize energy generation) may be of the form $$E(t) = \int_{t_0}^{t_1} P(t)dt \quad (3)$$

In some embodiments, from the optimization module, an optimal velocity profile is calculated for the WEC device, and the PTO (e.g., the resistance offered thereby) is modulated to follow the desired velocity profile and/or create the desired force. Control systems generally require mathematical models of the systems in question to determine or generate a control algorithm. For bodies of waters (e.g., oceans), this typically requires a model of ocean hydrodynamics, which are usually substituted with structurally less complex models (e.g., stochastic time series solutions based on historical data) due to the significant computational complexity of, for example, computational fluid dynamics (CFD) models. This limitation may be overcome by the methods and systems described herein, as a relatively computationally lightweight emulator of complex CFD models is provided.

The desired force is sent to the hydraulic control system (e.g., within the control system 408 in FIG. 4), which regulates the motion, oscillation, and velocity of movement of the WEC device (and/or the PTO) by controlling or tuning the resistance to motion (e.g., by adjusting the PTO). The resistance offered by the PTO is increased or decreased by the hydraulic control system to achieve the desired motion (or desired velocity profile). As described above, the end result may be that the WEC device is controlled in such a manner to maximize energy production, provide consistent energy generation, and/or prolong the service life of the WEC device (e.g., ensure survivability of the device by "detuning" the device in rough wave conditions).

The methods and systems described herein may assist with WEC devices being integrated into "smart grids." Smart grids may be considered as electricity networks that "intelligently" integrate generators and consumers to efficiently delivery electricity (e.g., with respect to capacity, coverage area, safety, reliability, etc.). Modern smart grids often utilize various technologies to instantly relay information regarding supply and demand to support effective decision making. The integration of renewable energy resources with these systems may be facilitated the accurate forecasting of energy production capacities (and demand). For WEC devices, this may involve accurate wave condition forecasting to enable estimates of energy production (e.g. voltage regulation and load), which enables the reduction operation costs based on marginal production costs). The methods and systems described here provide a fog (or edge) computing based implementation that presents the additional benefit of potentially more amenable integration with smart grid systems.

Figure 8:
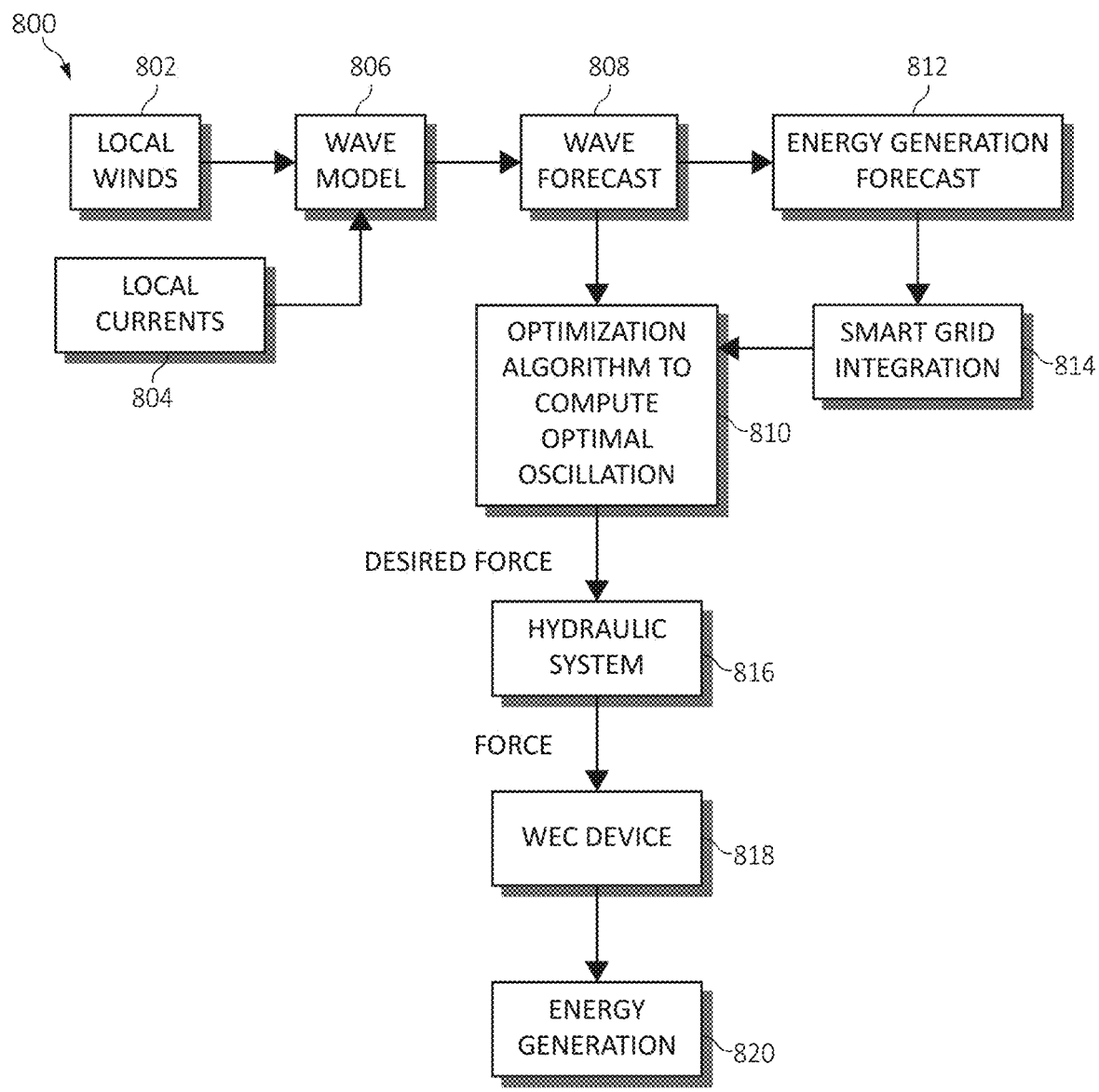
FIG. 8 is a block diagram/flowchart of a system for managing a WEC device according to an embodiment of the present invention.

FIG. 8 is a block diagram/flowchart of a system (or method) 800 for managing a WEC device, according to some embodiments described herein. In some embodiments, the system 800 is (entirely) implemented within a WEC device (or the method is entirely performed by a WEC device). In the depicted embodiment, local winds 802 and local currents 804 (e.g., as detected by a sensor array on the WEC device) are sent to wave model 806 (e.g., such as the wave model described above). The wave model 806 generates wave forecast (or a prediction of wave conditions) 808. The wave forecast 808 is sent to optimization algorithm (or module) 810, which computes optimal oscillation for the WEC device (and/or the PTO thereof).

In the depicted embodiment, the wave forecast 808 is used to generate an energy generation forecast 812, which is utilized to provide integration of the WEC device power generation with a smart grid 814. Information related to the smart grid (which may be transmitted to the WEC device or may be generated by a smart grid model within the device) may be sent to optimization module 810, which may appropriately adjust the optimal oscillation (e.g., based on grid demands). However, it should be understood that in some embodiments, the energy generation forecast 812 and the smart grid integration 814 may not be included/utilized.

Still referring to FIG. 4, the desired force (e.g., associated with the oscillation of the PTO) is sent to the hydraulic system 816. The hydraulic system 816 tunes or adjusts the PTO such that the (desired) force is imparted to the WEC device 818 (or the PTO), resulting in energy generation 820, as described herein.

As such, the methods and systems described herein provide locally computed forecasts of wave conditions to allow direct control specifications for the WEC device. The system (s) may include a low power computing device deployed locally on the WEC device. A wave energy hydraulic control system that manages device motion in response to incoming waves and energy generator specifications may also be provided (e.g., onboard the WEC device), as may a computationally efficient wave forecasting module, an optimization module to direct the electrical control system based on forecasted waves, energy generation requirements, and device robustness/survivability. The system may provides as output forecasts of control system configurations to optimize wave energy generation and device robustness based on local wave forecasts and smart grid requirements. Methods described herein may produce forecasts of wave conditions using machine learning algorithms and use the forecasts as inputs to an optimization module that incorporates wave condition predictions and energy generator configurations. Energy generation of device may be optimized based on predicted wave conditions, smart grid energy specifications, and hydraulic control management. The device control strategy may be utilized to manage future control of the WEC device (or other WEC devices).

Figure 9:
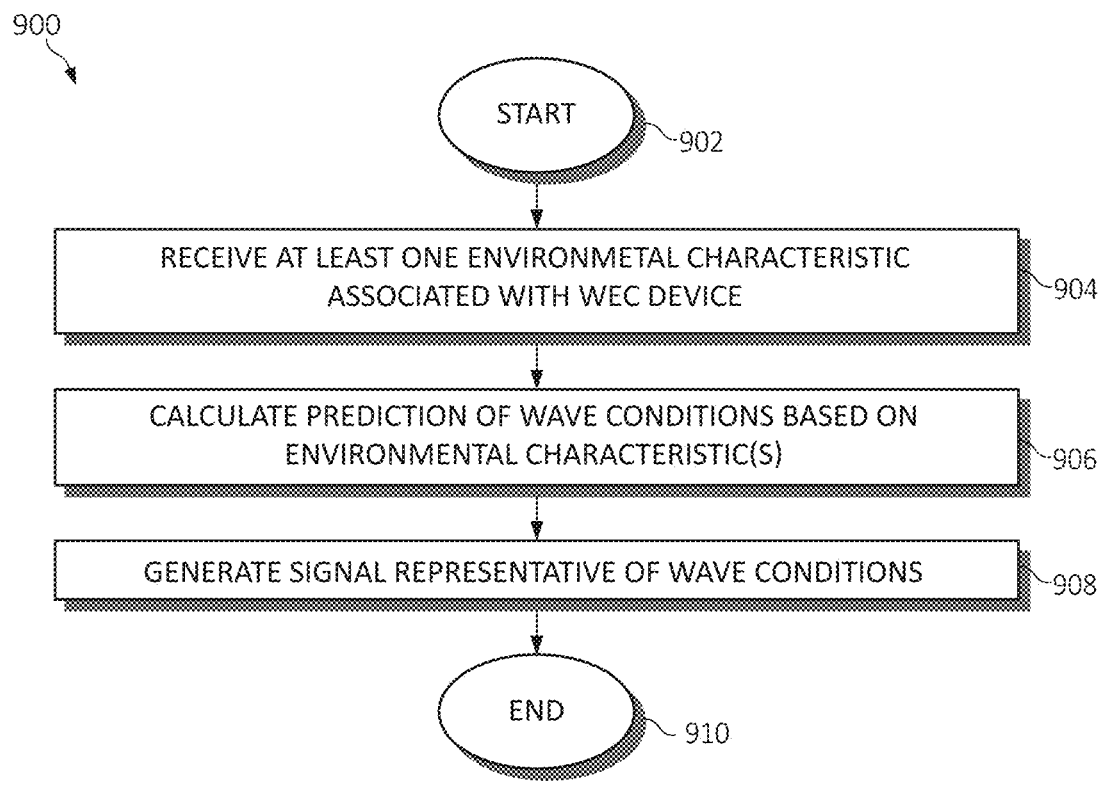
FIG. 9 is a flowchart diagram of an exemplary method for managing a WEC device according to an embodiment of the present invention.

Turning to FIG. 9, a flowchart diagram of an exemplary method 900 for managing a WEC device, according to some embodiments described herein, is provided. Method 900 begins (step 902) with, for example, a WEC device being deployed in a body of water (e.g., an ocean), which includes (or has integrated therein) the control system(s), such as a trained wave model as described, described above.

At least one environmental characteristic (or condition) associated with the WEC device in the body of water is received (step 94). The at least one environmental characteristic may be associated with at least one of winds and water currents (e.g., local winds and local currents in the area of the WEC device). In some embodiments, the environmental characteristic(s) is detected by a sensor onboard (or couple to) the WEC device. However, in some embodiments, the environmental characteristic(s) may be generated using a computational model.

A prediction of wave conditions on the body of water is calculated based on the at least one environmental characteristic (step 906). The calculating of the prediction of wave conditions may be performed with a computing system onboard the WEC device. The computing system may include a machine learning module. The machine learning module may utilize a multi-layer perceptron.

A signal representative of the prediction of wave conditions is generated (step 908). The signal may be utilized to control the WEC device. In particular, in some embodiments, the WEC device may be controlled on the prediction of wave conditions, as described above. For example, the WEC device may include a power take-off (PTO), and the controlling of the WEC device may include adjusting a resistance exhibited by the PTO.

Method 900 ends (step 910) with, for example, the WEC device being controlled based on the predicted wave conditions, and energy being generated, as described above. In some embodiments, the system monitors the energy generation and is capable of evaluating the performance of the WEC device such that changes to the control scheme may be made to further optimize performance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a wave energy converter (WEC) device comprising:
   receiving a plurality of environmental characteristics associated with a WEC device in a body of water;
   training, prior to deployment on the WEC device, a machine learning module associated with the WEC device using the plurality of environmental characteristics as inputs to produce a wave model, wherein the wave model is implemented to solve a predefined control problem definition of a prescribed performance objective for the WEC device output as a predefined velocity profile, and wherein the inputs for the wave model include, for a particular set of data associated with the body of water: a global wave height H, a time period T of detected waves, a direction D of the detected waves, a speed or magnitude $u_{wind}$ of east and west components of winds, a speed or magnitude $v_{wind}$ of north and south components of the winds, a speed or magnitude $u_{current}$ of east and west component of currents, and a speed or magnitude $v_{current}$ of north and south component of the currents;
   deploying the trained wave model on a computing system onboard the WEC device and initiating the machine learning module to collect current measurements of the body of water using the trained wave model, wherein the trained wave model is used to form a prediction of wave conditions on the body of water, and forecast a prediction of an energy production generated by a power take-off (PTO) of the WEC device, and wherein the prediction of wave conditions and the prediction of an energy production are used to create a control strategy for the WEC device to optimize a performance of the PTO and a service life of the WEC device;
   in conjunction with calculating the prediction of wave conditions on the body of water based on the trained wave model, computing the prediction of wave conditions inclusive of predictions of wave heights of the body of water of at least 24 hours in advance, wherein, notwithstanding the wave model is initially trained prior to the deployment on the WEC device, the generation of the wave model and the calculating the prediction of the wave conditions according to the wave model are each performed exclusively on the WEC device subsequent to the deployment using the plurality of environmental characteristics observed by sensors located exclusively on the WEC device; and
   controlling the WEC device based on the prediction of wave conditions according to the predefined velocity profile, wherein the controlling of the WEC device includes adjusting a resistance exhibited by the PTO.

2. The method of claim 1, wherein the machine learning module utilizes a multi-layer perceptron.

3. A system for managing a wave energy converter (WEC) device comprising:
   at least one processor that
      receives a plurality of environmental characteristics associated with a WEC device in a body of water;
      trains, prior to deployment on the WEC device, a machine learning module associated with the WEC device using the plurality of environmental characteristics as inputs to produce a wave model, wherein the wave model is implemented to solve a predefined control problem definition of a prescribed performance objective for the WEC device output as a predefined velocity profile, and wherein the inputs for the wave model include, for a particular set of data associated with the body of water: a global wave height H, a time period T of detected waves, a direction D of the detected waves, a speed or magnitude $u_{wind}$ of east and west components of winds, a speed or magnitude $v_{wind}$ of north and south components of the winds, a speed or magnitude $u_{current}$ of east and west component of currents, and a speed or magnitude $v_{current}$ of north and south component of the currents;
      deploys the trained wave model on a computing system onboard the WEC device and initiates the machine learning module to collect current measurements of the body of water using the trained wave model, wherein the trained wave model is used to form a prediction of wave conditions on the body of water, and forecast a prediction of an energy production generated by a power take-off (PTO) of the WEC device, and wherein the prediction of wave conditions and the prediction of an energy production are used to create a control strategy for the WEC device to optimize a performance of the PTO and a service life of the WEC device;

in conjunction with calculating the prediction of wave conditions on the body of water based on the trained wave model, computing the prediction of wave conditions inclusive of predictions of wave heights of the body of water of at least 24 hours in advance, wherein, notwithstanding the wave model is initially trained prior to the deployment on the WEC device, the generation of the wave model and the calculating the prediction of the wave conditions according to the wave model are each performed exclusively on the WEC device subsequent to the deployment using the plurality of environmental characteristics observed by sensors located exclusively on the WEC device; and controls the WEC device based on the prediction of wave conditions according to the predefined velocity profile, wherein the controlling of the WEC device includes adjusting a resistance exhibited by the PTO.

4. The system of claim 3, wherein the machine learning module utilizes a multi-layer perceptron.

5. A computer program product for managing a wave energy converter (WEC) device by one or more processors, the computer program product comprising a non-transitory computer-readable storage medium having computer-readable program code portions stored therein, the computer-readable program code portions comprising:

an executable portion that receives a plurality of environmental characteristics associated with a WEC device in a body of water;

an executable portion that trains, prior to deployment on the WEC device, a machine learning module associated with the WEC device using the plurality of environmental characteristics as inputs to produce a wave model, wherein the wave model is implemented to solve a predefined control problem definition of a prescribed performance objective for the WEC device output as a predefined velocity profile, wherein the lightweight emulator of the CFD model is implemented to solve a predefined control problem definition of a prescribed performance objective for the WEC device output as a predefined velocity profile, and wherein the inputs for the wave model include, for a particular set of data associated with the body of water: a global wave height H, a time period T of detected waves, a direction D of the detected waves, a speed or magnitude $u_{wind}$ of east and west components of winds, a speed or magnitude $v_{wind}$ of north and south components of the winds, a speed or magnitude $u_{current}$ of east and west component of currents, and a speed or magnitude $v_{current}$ of north and south component of the currents;

an executable portion that deploys the trained wave model on a computing system onboard the WEC device and initiates the machine learning module to collect current measurements of the body of water using the trained wave model, wherein the trained wave model is used to form a prediction of wave conditions on the body of water, and forecast a prediction of an energy production generated by a power take-off (PTO) of the WEC device, and wherein the prediction of wave conditions and the prediction of an energy production are used to create a control strategy for the WEC device to optimize a performance of the PTO and a service life of the WEC device;

an executable portion that, in conjunction with calculating the prediction of wave conditions on the body of water based on the trained wave model, computing the prediction of wave conditions inclusive of predictions of wave heights of the body of water of at least 24 hours in advance, wherein, notwithstanding the wave model is initially trained prior to the deployment on the WEC device, the generation of the wave model and the calculating the prediction of the wave conditions according to the wave model are each performed exclusively on the WEC device subsequent to the deployment using the plurality of environmental characteristics observed by sensors located exclusively on the WEC device; and an executable portion that controls the WEC device based on the prediction of wave conditions according to the predefined velocity profile, wherein the controlling of the WEC device includes adjusting a resistance exhibited by the PTO.

6. The computer program product of claim 5, wherein the machine learning module utilizes a multi-layer perceptron.

* * * * *